Oct. 1, 1946.   W. E. WILLIAMS   2,408,540
METHOD OF FORMING SCRATCH-RESISTANT ARTICLES
Filed Jan. 12, 1942    2 Sheets-Sheet 2
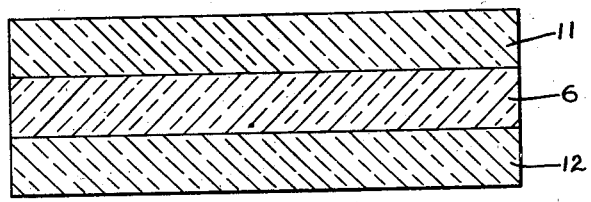
Fig. IV
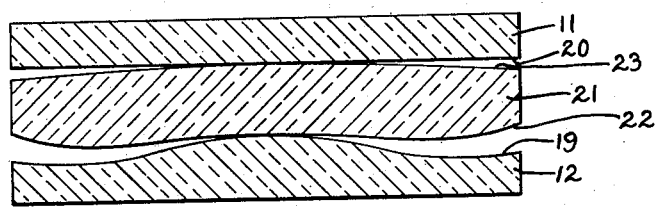
Fig. V
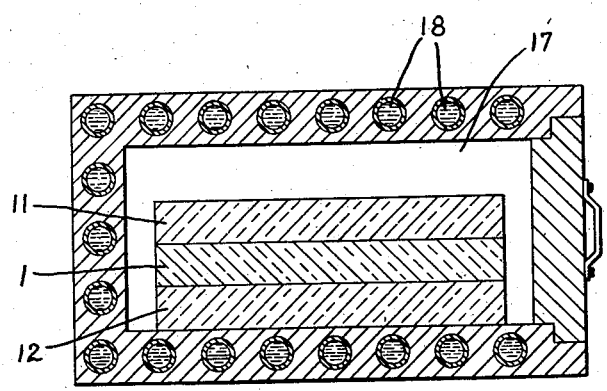
Fig. VI
INVENTOR
WILLIAM EWART WILLIAMS
BY
ATTORNEY Patented Oct. 1, 1946

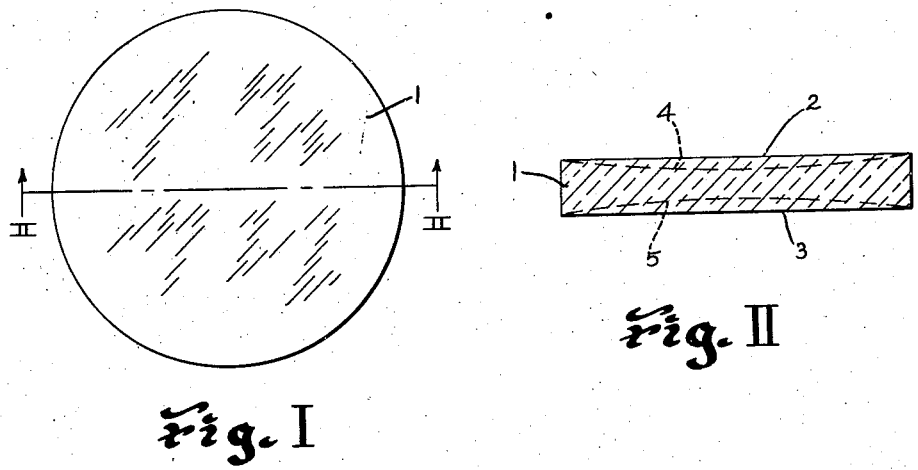
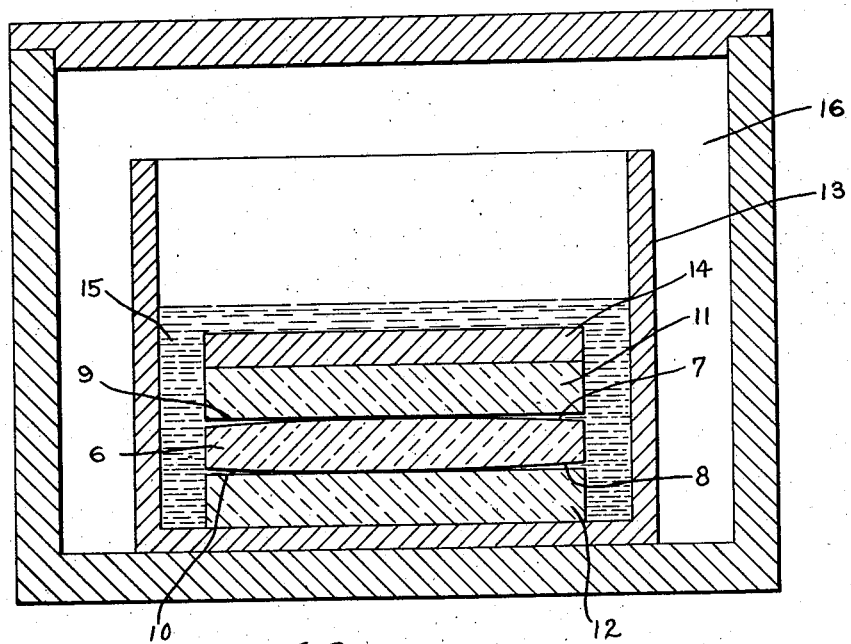

2,408,540

UNITED STATES PATENT OFFICE 2,408,540

METHOD OF FORMING SCRATCH-RESISTANT ARTICLES

William Ewart Williams, New York, N. Y.

Application January 12, 1942, Serial No. 426,478

3 Claims. (Cl. 18—47.5)

This invention relates to a method of making an improved formed article of plastic or like material. This application is a continuation in part of my co-pending application Serial No. 374,999, filed January 18, 1941.

One of the principal objects of the invention is to produce a formed article of plastic or like material having precision or high quality surfaces thereon.

Another object is to form an article of the above character substantially free from internal stresses.

Another object is to produce a formed article of plastic or like material having precision or high quality surfaces thereon with abrasive resisting coatings on said surfaces.

Another object is to provide a novel method of forming an article of plastic or like material simultaneously to the desired shape with precision or high quality surfaces thereon and with abrasive resisting coatings on said surfaces.

Another object is to provide a novel method of forming an article of the above nature with layer coatings disposed thereon by a partial depolymerization carried out simultaneously with the forming of said article and in such a manner that the bath reacts with a substance placed in the plastic to form a hard film on the surfaces of said plastic article.

Another object is to produce new and improved organic articles with surfaces which have increased scratch resistance and reduced porosity with said surfaces being substantially optically homogeneous and image distortion free.

Another object is to provide a new and improved method of producing articles of the above nature in a practical and economical manner.

Another object is to provide an improved method of forming an article of plastic or like material to the shape desired and with precision or high quality surfaces by placing preheated articles between suitable form dies in a bath, with said bath and said forming dies having characteristics which will produce the shape of article and surface textures desired on said article and simultaneously render said surfaces resistant to scratching.

Other objects and advantages of the invention will become apparent from the following description taken in conjunction with the accompanying drawings. It will be apparent that many changes may be made in the steps of the methods shown and described without departing from the spirit of the invention as expressed in the accompanying claims. It is, therefore, desired that the invention not be limited to the matter shown and described as the preferred forms only have been given by way of illustration.

The present invention is directed to the production of a formed article of plastic or like material with precision or high quality surfaces thereon and having substantially no internal stresses and with the said surfaces being resistant to scratching.

Referring to the drawings:

Fig. I is a front elevational view of an article produced according to the invention;

Fig. II is a sectional view taken as on line II—II of the article illustrated in Fig. I;

Fig. III is a diagrammatic sectional view illustrating one step of the process of manufacture;

Fig. IV is a sectional view illustrating another step in the process of manufacture;

Fig. V is a view generally similar to Fig. IV illustrating a modification of the invention and one stage of the process; and Fig. VI is a sectional view illustrating another step in the process of manufacture.

Referring more particularly to the drawings wherein similar reference characters denote similar parts throughout the several views the article 1, illustrated in Figs. I and II, is a transparent member formed of material such as methyl methacrylate, cellulose acetate and copolymers such as formerly manufactured by the Norton Company of Worcester, Mass., and now manufactured by the Dupont Co., Arlington, New Jersey and referred to herein as Norton #4025 which is the trade designation of this material. Norton resins are copolymers of methyl methacrylate and either methacrylic acid or methacrylate anhydride. They may also be co-polymers of methyl methacrylate and glycol di-methacrylate. The article 1, which is one of the many forms of articles which may be produced by the present invention, has optically flat precision or high quality surfaces 2 and 3 thereon which result from the present invention. These surfaces 2 and 3, in addition to being of precision and high quality are simultaneously rendered more resistant to scratching. The article referred to herein is merely an illustration of what may be accomplished by the teachings of the present invention. It is to be understood that, instead of forming the surfaces 2 and 3 optically flat, the said surfaces may be of concave curvature, as illustrated by the dash lines 4 and 5 or may be formed to any other surface shape desired, depending upon the particular use desired of the completed article. In the present instance, in forming the optically flat surfaces on the article 1, the blank 6, Fig. III, used in forming said article is first formed with roughly machined and buffed surfaces 7 and 8. These surfaces 7 and 8 are slightly convexed as illustrated in Fig. III so that when the optically flat surfaces 9 and 10 of the forming dies 11 and 12 engage said surfaces 7 and 8 they will contact the high point of said surfaces substantially at the center of the blank 6. This is to cause the air to be extruded from between the surfaces 7 and 8 of said article and the surfaces 9 and 10 when the article conforms to the shape of the respective surfaces 9 and 10. This is to prevent the pocketing of air between said surfaces and the possible formation of bubbles or the like.

The assembly, which constitutes the forming dies 11 and 12 and the blank 6, is then placed internally of a container 13 and a suitable weight 14 or other means is placed on the top of the upper forming die 11 in such a manner that there is no appreciable distortion of the surface 9 of said forming die. A bath 15, of solution which preferably comprises a small amount of ethyl orthosilicate dissolved in anhydrous ethyl alcohol, is then placed in the container 13. The container and assembly, including the bath 15, is then placed in a constant temperature chamber 16 and the chamber is maintained at 40° C., within close limits, for a period of the order of twelve hours. If a little lower temperature is used the time of immersion has to be very considerably increased. A more detailed description of this will be given later.

The above causes the forming dies 11 and 12 to slightly close in on the blank 6. The arrangement and formation of the parts including the bath is such that two major actions occur simultaneously. First, there is a slight softening of the outer surfaces 7 and 8 of the blank 6 with the result that the forming dies 11 and 12, which have optically flat surfaces 9 and 10 thereon simulating the surfaces which are to be formed on the blank 6, tend to close in on the blank 6 with the result that the surfaces 7 and 8 of the said blank tend to assume the shape of the surfaces 9 and 10 of the respective forming dies. In addition to the above the solution is such that there is a growth of a film on said surfaces 7 and 8 which has a scratch resisting nature. This film and the formation thereof is thoroughly disclosed in applicant's co-pending application, Serial No. 374,999, filed January 18, 1941, of which this application is a continuation in part.

The assembly which constitutes the blank 6 and the forming dies 11 and 12, as shown in Fig. IV, is then removed from the bath and maintained in a dry room at approximately the same temperature as the bath for, say twelve hours, although this is not critical. The longer the assembly is maintained at this constant temperature the more accurately do the final surfaces of the blank conform to the surfaces of the forming dies. The assembly, at this stage of the process and as shown in Fig. IV, simulates a single integral unit as the parts can not be separated from each other without risk of breaking the plastic blank 6 or the forming dies 11 and 12.

In order to separate the components of the assembly without causing any permanent injury or distortion of the now formed plastic article 1, the said assembly is placed in a cooling chamber 17, such as diagrammatically illustrated in Fig. VI. This cooling chamber may be of any suitable desired type. In the present instance the said cooling system is illustrated as comprising a plurality of cooling pipes 18 having a suitable liquid refrigerant therein. When placed in the cooling chamber, the said assembly is slowly cooled (so that the dies are not deformed by the temperature gradient introduced) and the differential contraction effected by the forming dies and the now formed plastic article 1, causes the forming dies to spring loose. At this low temperature the plastic is very rigid so that no permanent deformation of the surfaces occur in the springing off of the forming dies 11 and 12. By this method one can obtain surfaces of high optical precision. This is due primarily to the following reasons:

The effective forming is carried out at a constant temperature of approximately 40° C. or at a temperature which is not greatly above room temperature as compared with the temperatures required in a commonly used molding process. The magnitude of the order of the weights or other desired pressure means 14 required to keep the forming dies in contact with the plastic blank 6 is very low in comparison with the loads or pressures required in molding so that the physical deformation of the dies and the plastic material are extremely small. The resulting article will have substantially no internal stresses. Because of the fact that the blank 6 is originally provided with slightly convex surfaces 7 and 8, particularly when the forming dies have optically flat surfaces, no air will be trapped between the plastic blank and the surfaces of the dies. This is due to the fact that as the dies gradually sink into the plastic such action takes place in a direction progressively outwardly from the center of the dies and causes the air or any liquid which may be between the dies and blank to be driven out of the sides thereof.

The hardened or scratch resisting surfaces mentioned above result from the particular type of the bath 15 used. Such hardened surfaces would not result from the use of a simple bath of anhydrous ethyl alcohol or similar material and the surfaces of such a formed plastic would become immediately deformed when the dies 11 and 12 were removed.

It has been found that instead of using ethyl orthosilicate in the bath 15 a bath of aluminum ethoxide dissolved in xylol or magnesium methoxide or magnesium ethylate dissolved in a small amount of methyl alcohol may be used, all of which are combinations of alkyl radicals and ceramic radicals which break down by reaction with water present in the plastic article to produce a ceramic coating thereon. Small amounts of these solutions are in turn placed in the ethyl alcohol baths by following the teachings of applicant's co-pending application, Serial No. 374,999, filed January 18, 1941. If a solution containing ethyl orthosilicate is to be used the said orthosilicate is placed in the most nearly anhydrous ethyl alcohol which is commercially available or which contains the least water (99.5% pure). Approximately 1% by volume of ethyl orthosilicate is used.

Of course, it is to be understood that prior to subjecting the blank of plastic 6 to the above forming process it is first made certain that the blank does not have any dirt or undesirable foreign matter thereon. This is accomplished by washing the plastic blank in isopropyl alcohol which not only removes said foreign matter but also removes the outer water which might be present and otherwise possibly cause the plastic to crack as set forth in applicant's co-pending application, Serial No. 374,999, mentioned above. In this application it is stated that if methyl methacrylate has been saturated with water and is immersed in anhydrous ethyl alcohol the surface is injured even to the depth of almost one millimeter by the rapid removal of the water as shrinkage of the surface results. This shrinkage of the surface is accompanied by a multitude of cracks. Therefore, part of this water must be removed by relatively slow drying or by other means before the methyl methacrylate is immersed in the anhydrous ethyl alcohol solution. If the methyl methacrylate is used just after the usual surface protection mask, commonly used in the art, has been removed then the preliminary drying usually is not necessary, provided the washing has been carried out immediately after the heat treatment of the sheets after polymerization. The invention produces a hard inorganic film on an organic substance which is either:

(a) The result of a chemical reaction taking place in the solution between the material dissolved in the solution and something yielded up to the solution from the surface or body of the base.

(b) The result of a chemical reaction between the material in the solution and something in the base at the surface of the base.

The action is believed to take place between the substance in the solution and water which is present in the base or possibly between traces of moisture in the solvent and the dissolved substance or solute.

In general, there must be some water present in the plastics or material of the body being formed. That is, the substances to be treated must have the property of absorbing and liberating water or other reactive agent.

As stated herein, however, the water present in the plastic or body being treated must be controlled so that only a sufficient amount thereof is present to bring about the chemical reaction desired and so that the amount of water present will not be sufficient to cause the plastic to contract rapidly or shrink and crack as set forth above.

Immediately after the removal of the dirt or other foreign matter from the surfaces of the blank 6, the blank 6 is placed in the liquid bath 15 in proper relation with the forming dies 11 and 12 as set forth above. It has been found that when the process is carried out at about 40° C. or higher, small defects which might be present in the surfaces 7 and 8 seem to disappear entirely. If lower temperatures are used, however, these small defects do not as readily disappear.

When ethyl orthosilicate is used concentrations up to 10% may be formed. When it is desired to use a relatively high concentration of magnesium methoxide or magnesium methylate a large proportion of methyl alcohol is used in the bath. This is because of the fact that as far as can be determined magnesium methoxide is relatively insoluble in ethyl alcohol so methyl alcohol is first used to dissolve it in. Therefore, for high concentrations, one must use a very large proportion of anhydrous methyl alcohol in the ethyl alcohol. One dare not use a high temperature because the methyl alcohol starts to attack the methyl methacrylate plastic. In this instance, one uses a temperature of about 35° C. but then again it is a function of the type of plastic used. When using Norton co-polymers the optimum temperatures may be still higher even in the case of magnesium methoxide solutions having a high percentage of methyl alcohol. It is a case of where one must balance the attack or possible tendency to dissolve the plastic by the alcohol bath. The purpose of softening the outer layers of the plastic is merely to take up the gross irregularities in the buffed surfaces of the blank. The accurate surfaces are obtained by the growth of the coatings. The forming or shaping can not be accomplished entirely with pure coatings since these coatings are inherently fairly thin. The practical point is that when one removes the dies from the plastic which has been treated with the coating material the surface is strong enough to withstand it, while without the coating, the removal without distortion of the plastic is very difficult if not impossible since the underlying surfaces are soft. The temperature range is a function of the nature of the plastic and the characteristics of the alcohol bath used in conjunction with said plastic.

The various different solutions set forth above by means of which the blank 6 is superficially softened so as to assume the shape of the surfaces of the forming dies 11 and 12 and by means of which the said resultant surfaces will be more resistant to mechanical and chemical attack will hereinafter be referred to generically as baths of organo metallic compounds; silicon for the purpose of this discussion is being considered a metal in spite of the fact that it is frequently classed amongst the non-metals.

Although applicant has set forth only one shape of article it is to be understood that any shape of article having any desired surface shapes such as torics, sphericals, asphericals, atorics or other surfaces of compound curvatures may be formed as well as lenses having two or more different focal fields. Particular importance is placed in making Schmidt plates out of Norton copolymer or resin and that the relatively thin and large area of such plates, if said plates are made of glass, is apt to cause said plates to break under cannon fire while under similar conditions the plastic will stand up permanently.

In Fig. V it is to be noted that the forming die 12 has a surface 19 thereon of compound curvature while the forming die 11 has a relatively flat surface 20 thereon. The article 21 which is to be provided with surfaces shaped to the respective surfaces 19 and 20 has a surface 22 preformed thereon with a compound curvature controlled with respect to the compound curvature of the surface 19 so that the article will first engage the compound curved surface 19, at the center of the forming die, and as the said surface 22 conforms to the shape of the surface 19 said conforming will be in a progressively outward direction so as to insure the extruding of all of the air and liquid which might be between said surfaces. This is brought about by so controlling the curvatures of the compound surface 22 with respect to the surface 19 that this result will be obtained. In connection with the forming of the surface 22 it is to be noted that the central area of said surface has a flatter curvature than the central area of the surface 19 and the outwardly reversely curved portions of the surface 22 have a shorter radius than the outwardly reversely curved portions of the surface 19.

The opposed surface 23 on the article is formed to a slightly convexed shape so that it will engage the flat surface 20 at the center. The said surface 23 therefore will conform to the shape of the surface 20 in an outward and progressive manner so that all air and liquid will be expelled from between said surfaces.

The article resulting from the above, like the previously described articles, will assume the shape of the contacting surfaces of the dies 11 and 12 and will have exposed surfaces which are more resistant to scratching than the initial material.

The curvatures of the opposed surfaces formed on the various articles set forth above are carefully controlled according to the index of refraction of the material used in order to produce the refractive characteristics desired of said article, particularly, in instances when the article has curved or compound curved surfaces thereon.

From the foregoing description it will be seen that a simple, efficient and economical method has been prescribed for accomplishing all of the objects and advantages of the invention.

Having described my invention, I claim:

1. The method of forming an article of the character described and of simultaneously producing an inorganic outer layer on said article more resistant to scratching than the material of said article comprising forming a bath containing a compound selected from a group consisting of aluminum ethoxide, ethyl silicate, magnesium methoxide and magnesium ethoxide dissolved in a liquid selected from the group consisting of xylol, methyl alcohol, and anhydrous ethyl acohol, placing a blank of organic synthetic resin of a type capable of being superficially softened by the bath and having water therein of an amount sufficient to react with the compound in the bath between forming dies having finished optical surfaces thereon of the contour desired to be formed on the article, placing the assembly in the bath, exerting a pressure on one of said dies in the direction of the other of said dies, subjecting said assembly in said bath to a controlled temperature of an amount and for a time interval sufficient to cause the compound in the bath to react with the water in the material of the blank to form a layer of the reaction product on said blank and for the bath to slightly soften the outer surfaces of the blank and, under the pressure of the dies thereon, cause said surfaces to assume the approximate shape of the contiguous surfaces of the dies, removing said assembly from the bath and subjecting said assembly to a drying atmosphere of a controlled temperature and for a time interval sufficient to properly set the surfaces to the shape of the dies.

2. The method of forming an article of the character described and of simultaneously producing an inorganic outer layer on said article more resistant to scratching than the material of said article comprising forming a bath containing a compound selected from a group consisting of aluminum ethoxide, ethyl silicate, magnesium methoxide and magnesium ethoxide dissolved in a liquid selected from the group consisting of xylol, methyl alcohol and anhydrous ethyl alcohol, placing a blank of a resin consisting mostly of polymerized methyl methacrylate and having water therein of an amount sufficient to react with the compound in the bath between forming dies having finished optical surfaces thereon of the contour desired to be formed on the article, placing the assembly in the bath, exerting a pressure on one of said dies in the direction of the other of said dies, subjecting said assembly in said bath to pressure and a relatively controlled temperature of an amount and for a time interval sufficient to cause the compound in the solution of the bath to react with the water in the material of the blank to form a layer of the reaction product on said blank and for the bath to slightly soften the outer surfaces of the blank and, under the pressure of the dies thereon, to cause said surfaces to assume the approximate shape of the contiguous surfaces of the dies, removing said assembly from the bath and subjecting said assembly to a drying atmosphere of a controlled temperature and for a time interval sufficient to properly set the surfaces to the shape of the dies.

3. The method of forming an article of the character described and of simultaneously producing an inorganic outer layer on said article more resistant to scratching than the material of said article comprising forming a bath containing a compound selected from a group consisting of aluminum ethoxide, ethyl silicate, magnesium methoxide and magnesium ethoxide dissolved in a liquid selected from the group consisting of xylol, methyl alcohol, and anhydrous ethyl alcohol, placing a blank of organic synthetic resin of a type capable of being superficially softened by the bath and having water therein of an amount sufficient to react with the compound in the bath between forming dies having finished optical surfaces thereon of the contour desired to be formed on the article, placing the assembly in the bath, exerting a pressure on one of said dies in the direction of the other of said dies, subjecting said assembly in said bath to a controlled temperature of an amount and for a time interval sufficient to cause the compound in the bath to react with the water in the material of the blank to form a layer of the reaction product on said blank and for the bath to slightly soften the outer surfaces of the blank and, under the pressure of the dies thereon, cause said surfaces to assume the approximate shape of the contiguous surfaces of the dies, removing said assembly from the bath and subjecting said assembly to a drying atmosphere of a controlled temperature and for a time interval sufficient to properly set the surfaces to the shape of the dies, and then subjecting said assembly to a refrigerant to cause said dies to spring loose from the blank.

WILLIAM EWART WILLIAMS.